(12) United States Patent
Bucko et al.

(10) Patent No.: US 12,162,201 B2
(45) Date of Patent: *Dec. 10, 2024

(54) EXTERNAL COOLING AIR RING FOR BLOWN-FILM EXTRUSION

(71) Applicants: Michael Peter Bucko, Mississauga (CA); Ricardo Pablo Rodriguez, Mississauga (CA)

(72) Inventors: Michael Peter Bucko, Mississauga (CA); Ricardo Pablo Rodriguez, Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,544

(22) Filed: Mar. 27, 2023

(65) Prior Publication Data

US 2024/0109235 A1 Apr. 4, 2024

Related U.S. Application Data

(63) Continuation of application No. 16/820,945, filed on Mar. 17, 2020, now Pat. No. 11,618,200.

(51) Int. Cl.
| | | |
|---|---|---|
| *B29C 48/88* | (2019.01) | |
| *B29C 48/00* | (2019.01) | |
| *B29C 48/10* | (2019.01) | |
| *B29C 48/885* | (2019.01) | |
| *B29C 48/90* | (2019.01) | |
| *B29C 48/92* | (2019.01) | |
| *B29L 23/00* | (2006.01) | |

(52) U.S. Cl.
CPC ........ *B29C 48/913* (2019.02); *B29C 48/0018* (2019.02); *B29C 48/10* (2019.02); *B29C 48/885* (2019.02); *B29C 48/90* (2019.02); *B29C 48/92* (2019.02); *B29L 2023/001* (2013.01)

(58) Field of Classification Search
CPC ... B29C 48/913; B29C 48/0018; B29C 48/10; B29C 48/885; B29C 48/90; B29C 48/92; B29C 55/28; B29C 2948/926; B29C 2948/92647; B29C 2948/92971; B29C 48/32; B29L 2023/001
See application file for complete search history.

(56) References Cited

U.S. PATENT DOCUMENTS

| | | |
|---|---|---|
| 3,618,169 A | 11/1971 | Coast |
| 4,139,338 A | 2/1979 | Cole |
| 4,209,475 A | 6/1980 | Herrington et al. |
| 4,259,047 A | 3/1981 | Cole |
| 4,408,970 A | 10/1983 | Bustin et al. |
| 4,443,400 A | 4/1984 | John |
| 4,478,564 A | 10/1984 | Shinmoto |

(Continued)

*Primary Examiner* — Jeffrey M Wollschlager
(74) *Attorney, Agent, or Firm* — Mark D. Perdue

(57) ABSTRACT

An air ring comprises a circular plenum in fluid communication with a source of pressurized air. An upper and lower annular lips are in fluid communication with the plenum through upper and lower channels and are arranged to supply air to the blown film bubble. A plurality of vanes are disposed in the upper channel and extend radially inwardly from the plenum to the upper annular lip. The vanes divide the upper channel into a plurality of radially extending channel segments. Each vane has a selected length and a distal end proximal the upper annular lip, the distal end being spaced from the upper annular lip no greater than about 20% of the length of the vanes. A powered plunger extends between the vanes of each of the channel segments to vary the cross-sectional area of the channel segments.

16 Claims, 6 Drawing Sheets

(56) References Cited

U.S. PATENT DOCUMENTS

| | | |
|---|---|---|
| 4,632,801 A | 12/1986 | Dowd |
| 4,750,874 A | 6/1988 | Keim |
| 4,826,414 A | 5/1989 | Planeta |
| 5,281,375 A | 1/1994 | Konermann |
| 5,288,219 A | 2/1994 | Smith |
| 5,464,336 A | 11/1995 | Planeta |
| 5,468,134 A | 11/1995 | Cree |
| 5,676,893 A | 10/1997 | Cree |
| 5,804,221 A | 9/1998 | Planeta et al. |
| 6,068,462 A | 5/2000 | Wybenga |
| 6,739,855 B2 | 5/2004 | Randolph et al. |
| 6,783,344 B1 | 8/2004 | Rudolf |
| 7,314,592 B2 | 1/2008 | Randolph et al. |
| 7,654,808 B2 | 2/2010 | Mirek et al. |
| 7,806,674 B2 | 10/2010 | Joppe et al. |
| 8,956,136 B2 | 2/2015 | Zimmermann |
| 9,017,053 B2 | 4/2015 | Rübbelke |
| 9,327,440 B2 | 5/2016 | Joppe et al. |
| 9,409,340 B2 | 8/2016 | Bertrand |
| 9,457,526 B2 | 10/2016 | Zimmermann et al. |
| 9,810,488 B2 | 11/2017 | Rübbelke et al. |
| 10,232,543 B2 | 3/2019 | Shimizu et al. |
| 11,298,865 B2 | 4/2022 | Cree et al. |
| 2002/0004081 A1 | 1/2002 | Raiko et al. |
| 2002/0018822 A1 | 2/2002 | Krycki |
| 2002/0130431 A1 | 9/2002 | Randolph et al. |
| 2006/0099291 A1 | 5/2006 | Planeta et al. |
| 2008/0061460 A1 | 3/2008 | Zimmermann et al. |
| 2008/0258325 A1 | 10/2008 | Zimmermann |
| 2009/0252819 A1 | 10/2009 | Joppe et al. |
| 2014/0057010 A1 | 2/2014 | Ruebbelke et al. |
| 2016/0250792 A1 | 9/2016 | Caccia et al. |
| 2016/0250794 A1 | 9/2016 | Parker |
| 2017/0015043 A1 | 1/2017 | Shimizu et al. |
| 2018/0126616 A1 | 5/2018 | Ponsiani |
| 2018/0361647 A1 | 12/2018 | Nakano |
| 2019/0358884 A1 | 11/2019 | Zimmermann et al. |
| 2020/0016815 A1 | 1/2020 | Brink et al. |
| 2021/0162644 A1 | 6/2021 | Nappa et al. |

EXTERNAL COOLING AIR RING FOR BLOWN-FILM EXTRUSION

BACKGROUND OF THE INVENTION

1. Field of the Invention

The invention relates generally to blown-film extrusion apparatus. More particularly, the invention relates to devices for external cooling of the film bubble or tube, also known as air rings.

2. Summary of the Prior Art

Blown-film extrusion is the dominant method of producing polymer or plastic tubes and sheeting. Typically, blown-film extrusion is carried out vertically upwards (see, e.g., FIG. 1), but horizontal and downward extrusion processes are also used in specialized applications. Polymer material is melted into a viscous liquid and then is extruded through an annular die. Air is injected through a hole in the center of the die, and the pressure causes the extruded melt to expand into a conical tube shape. An external cooling device or air ring creates at least one venturi zone to lock the tube to a mechanical forming cone designed to maintain the conical tube shape as the material transitions to a constant diameter tube.

As the viscous liquid travels away from the die, the cooling process transitions the phase from liquid to solid. This position is often referred to as the "frost" or "freeze" line. Above the frost line, the tube has roughly reached the final diameter. Past the frost line, the polymer tube moves into a low-friction collapsing frame, which leads to a set of nip rollers. The collapsing frame forces the tube into a transition from round to flat so the film can physically enter into the small gap between the nip rollers. The nip rollers grip the flattened tube and provide the pulling force required to move the tube up the extrusion tower (the speed of the nip rollers relative to the material exit rate from the die controls material thickness). The result is a fully flattened tube of two flat film layers, of a selected flat width, which are then pulled by a winder or a second set of nip rollers into the winding or accumulation station. Prior to the accumulation station, the tube may optionally be slit to form various flat sheet configurations.

Control of the thickness or gauge of the film making up the tube occurs primarily at the extrusion die. The external cooling device or air ring blows pressurized air at controlled temperature onto the exterior diameter of the tube or bubble as it exits the die. The air exits the air ring from an annular, circumferential slot known as a "lip." An air ring may have multiple lips at different axial heights on the interior of the ring.

Various schemes have been employed to control characteristics of air exiting the lips of an air ring, which can in turn influence characteristics of the tube or bubble as it cools.

SUMMARY OF THE INVENTION

It is a general object of the present invention to provide an improved air ring for cooling a blown film bubble. This and other objects of the invention are achieved by providing an air ring comprising a circular plenum in fluid communication with a source of pressurized air. An upper annular lip is in fluid communication with the plenum through an upper channel and arranged to supply air to the blown film bubble. A lower annular lip is in fluid communication with the plenum through a lower channel and is arranged to supply air to the blown film bubble at a location axially below the upper annular lip. A plurality of vanes are disposed in the upper channel and extend radially inwardly from the plenum to the upper annular lip. The vanes divide the upper channel into a plurality of radially extending channel segments. Each vane has a selected length and a distal end proximal the upper annular lip, the distal end being spaced from the upper annular lip no greater than about 20% of the length of the vanes. A powered plunger extends between the vanes of each of the channel segments to vary the cross-sectional area of the channel segments.

According to one embodiment of the present invention, the air ring further comprises a perforated baffle ring between the plenum and upper channel to provide a flow restriction.

According to another embodiment of the present invention, the air ring further comprises a control grid between the plenum and the lower channel, the control grid including apertures of selectively variable area to control air flow to the lower annular lip.

According to still another embodiment of the present invention, the air ring further comprises an upper plenum ring assembly including the plenum; a lower plenum ring assembly including the upper and lower annular lips; and the baffle ring is captured in recesses between the upper and lower plenum ring assemblies and is removable from the air ring by separating the upper and lower plenum ring assemblies.

According to yet another embodiment of the present invention, a controlled motor powers each plunger, each motor and plunger selectively operable to change the cross-sectional area of the channel.

Other objects, features, and advantages of the present invention will become apparent to those skilled in the art upon review of the drawings and the detailed description, which follow.

DETAILED DESCRIPTION OF THE INVENTION

Figure 1:
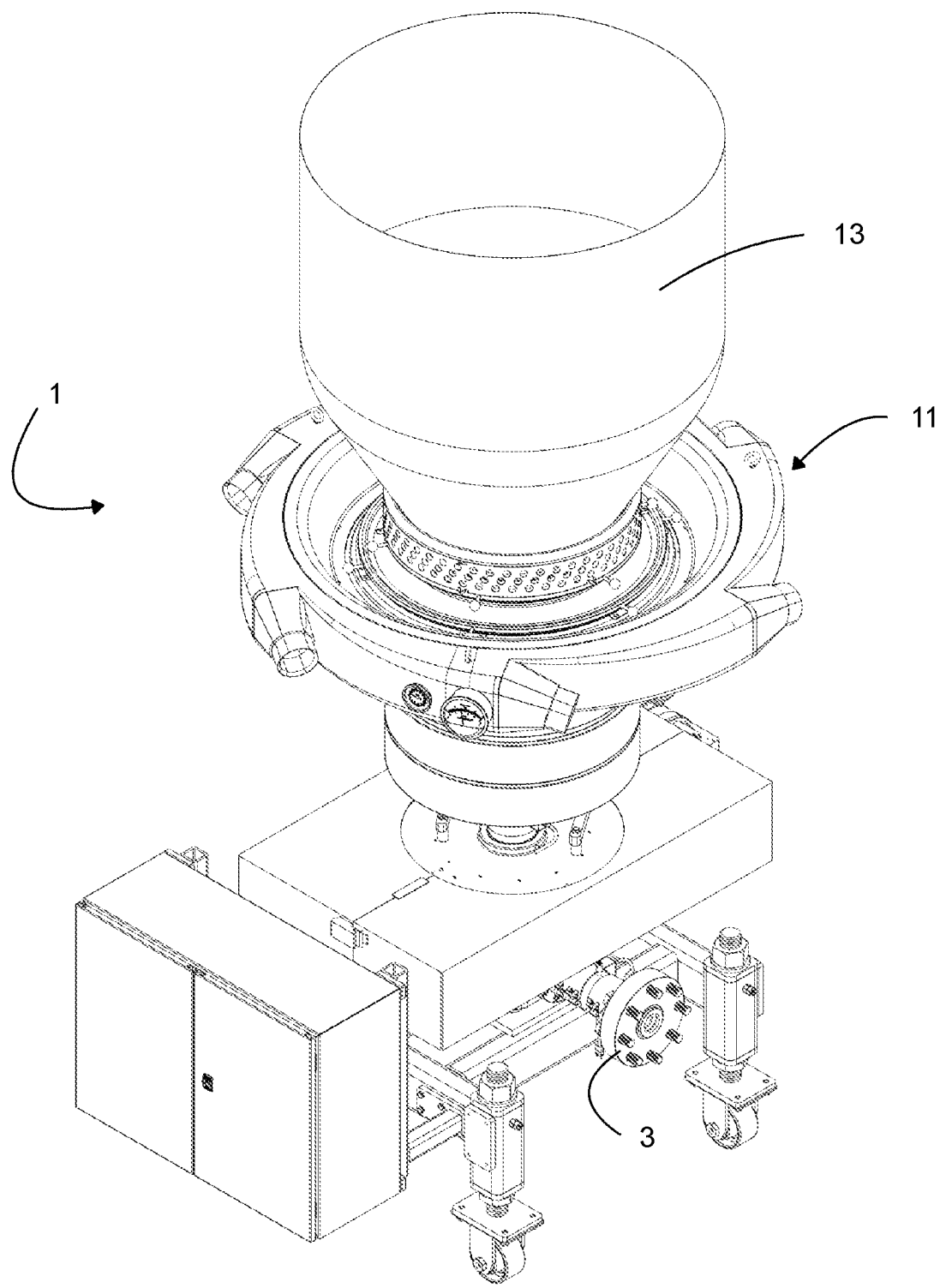
FIG. 1 is an elevation view of a portion of blown-film extrusion apparatus of the type employing an air ring in accordance with the present invention.

Turning now to the Figures, and particularly to FIG. 1, a portion of a blown-film extrusion apparatus 1 is depicted. Apparatus 1 may include an annular die (obscured from view), which may be coupled to a polymer extruder at coupling 3 and may include or be coupled to a blower or source of pressurized air. An external cooling device or air ring 11 may be disposed immediately above an annular die (obscured from view) and below a forming cone 13. As described above, a polymer bubble or tube is extruded from the die and inflated into a tube by air injected through the center of the die. The tube moves upward through the air ring 11, which cools the exterior of the bubble and forms it to cone 13. Cooling air exits air ring 11 by one or more annular openings or lips 51, 61 (in FIGS. 3 and 5) and impinges on the bubble or tube.

Figure 2:
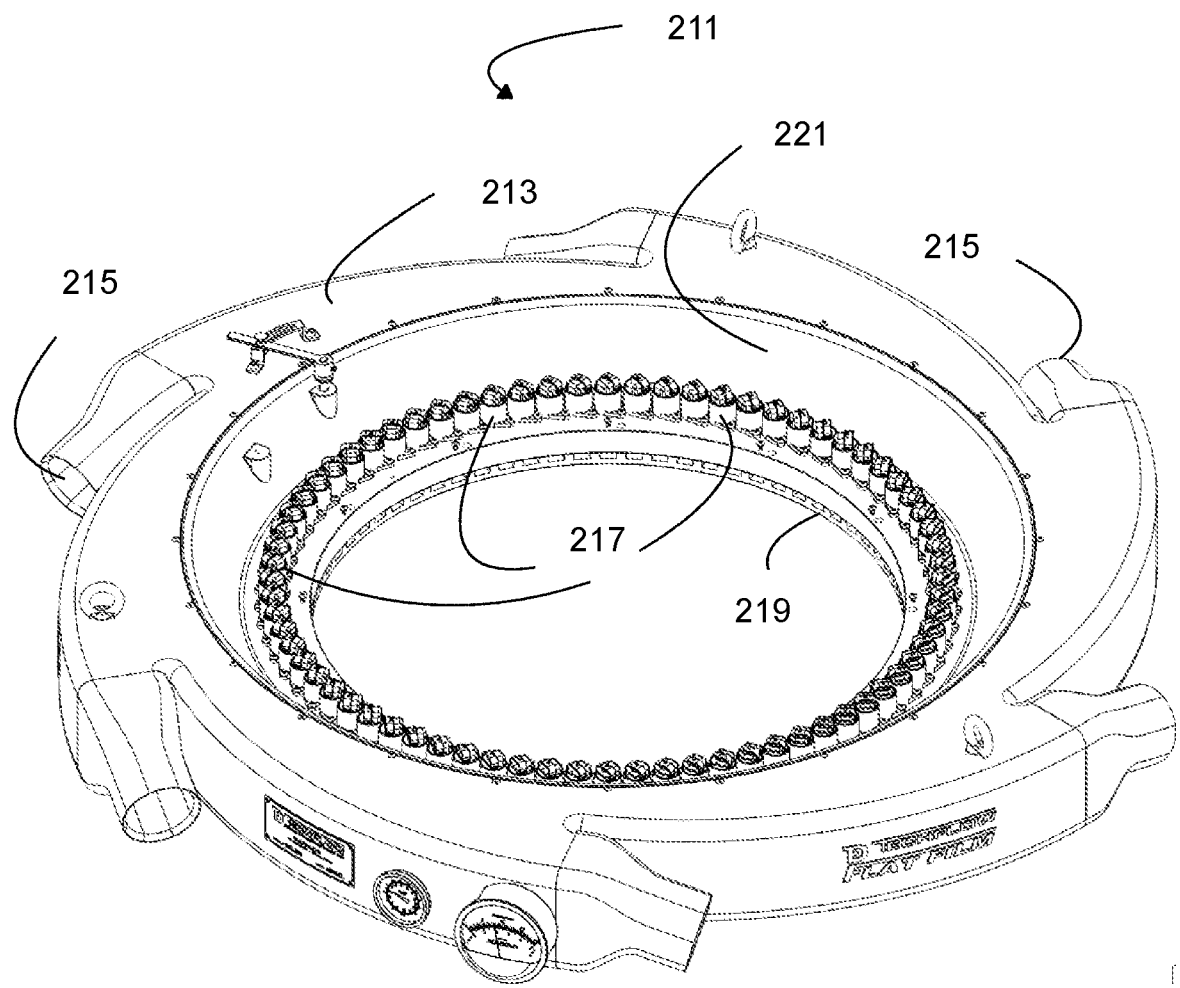
FIG. 2 is a perspective, enlarged view of an outer and upper portion of an air ring according to the present invention.
Figure 3:
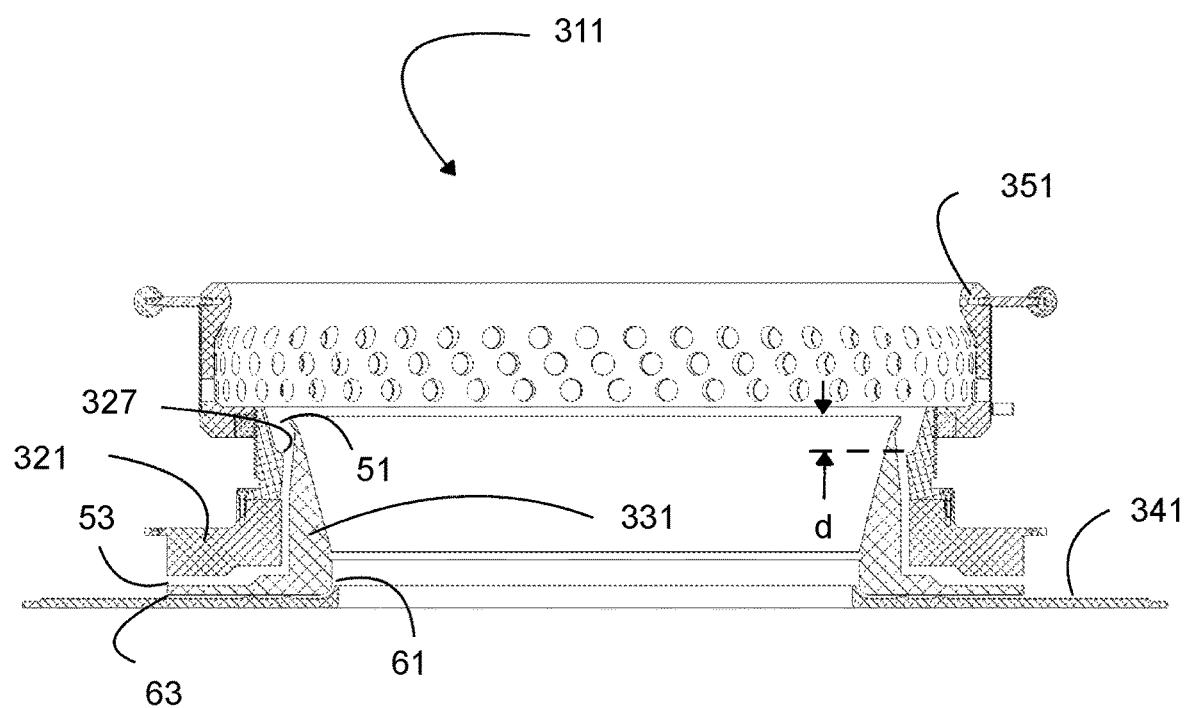
FIG. 3 is an elevation section view of an inner and lower portion of an air ring according to the present invention.

According to a preferred embodiment of the present invention, air ring 11 may comprise two main parts or portions: an upper or outer plenum ring assembly 211 (illustrated in greater detail in FIG. 2), and an inner or lower plenum ring assembly 311 (illustrated in greater detail in FIG. 3). Upper or outer plenum ring assembly 211 may be assembled on top of and surrounding lower or inner plenum ring assembly 311, as described in greater detail below.

FIG. 2 depicts an upper or outer plenum assembly 211 in accordance with a preferred embodiment of an air ring of the present invention. Plenum 211 may be a generally circular, toroidal, hollow body 213 with a plurality of (five) air inlets 215 spaced evenly about its circumference. Air inlets 215 may be attached to a blower or source of pressurized air through hoses or conduits (not shown) to admit air to the interior of plenum body 213.

A plurality of (72) electric motors 217 may be disposed at the inner periphery of outer or upper plenum assembly 211 and may be evenly circumferentially spaced about it. A bottom plenum 219 may be disposed at a lower extent of plenum assembly 211 and is described in greater detail in connection with FIGS. 4 and 5. A plenum top 221 may extend between motors 217 and the uppermost surface of plenum 211 and may at least partially support motors 217.

Figure 4:
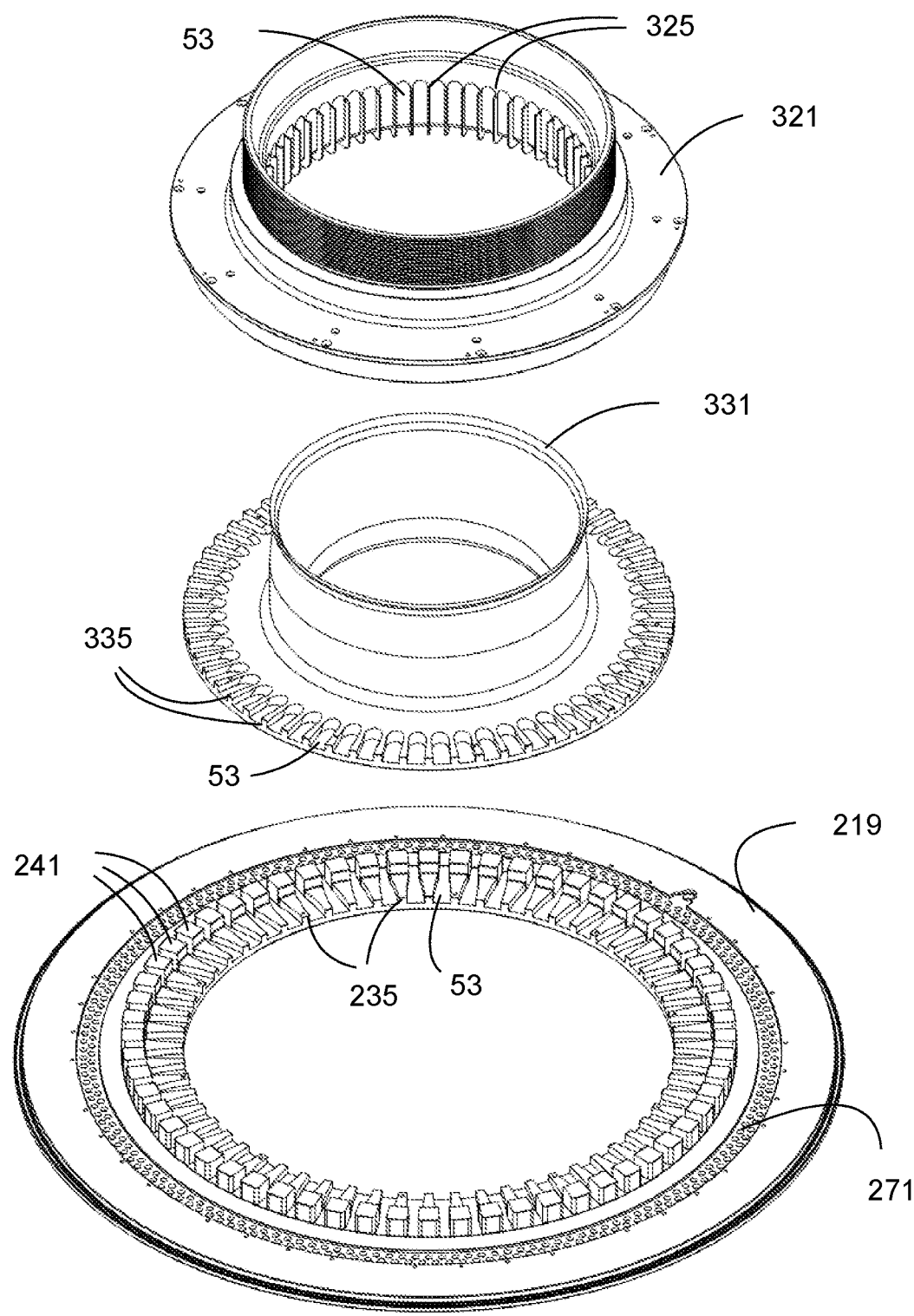
FIG. 4 is an exploded view of three of the parts of the inner and lower portion of the air ring of FIG. 3.

FIGS. 3 and 4 illustrate an inner or lower plenum ring assembly 311. An outer ring 321 may surround and sit on top of an inner ring 331. Both outer 321 and inner 331 rings may sit on top of an annular lower plate 341. An upper annular lip 51 may be formed between outer and inner rings 321, 331. A lower annular lip 61 may be formed between inner ring 331 and lower plate 341 and may be axially spaced-apart and below upper annular lip 51. A supplemental lip ring 351 may be secured by threads to the upper extent of outer ring 21.

As described in greater detail in below, a space or gap between outer and inner rings 321, 331 may define an annular upper channel 53 that communicates air to upper lip 51. A space or gap between inner ring 331 and lower plate 341 may define an annular lower channel 63 that communicates air to lower lip 61. A band or annular ring of a plurality of apertures 271 may be formed near the outer periphery or diameter of bottom plenum 219, which, upon assembly is at the inlet or outer periphery of lower channel 63.

According to a preferred embodiment of the air ring of the present invention, upper channel 53 is radially divided into a plurality of radially extending channel segments by vanes. The number of channel segments corresponds to the number of motors 217 and preferably is 72. As shown in FIG. 4, a plurality of (73) vanes 325 may be formed on and extend both vertically and horizontally across the interior diametral and horizontal surfaces of outer ring 321. A plurality of (73) corresponding vanes 335 may be formed on and extend across the upper horizontal surface of inner ring 331. Similarly, a plurality of (73) corresponding vanes 253 may be formed on an upper surface of bottom plenum 219. Vanes 253 may terminate at their outermost diameter or proximal ends with enlarged motor bosses 241.

Each vane has an overall length that comprises the length, measured linearly, of each portion 253, 325, 335 making up the each vane from the outermost or proximal end of the vane to its innermost or distal end 327. Preferably, each vane is of the same selected length.

Ideally, each vane terminates at its distal end 327 as close as possible to upper lip 53 so that divided airflow is maintained, without mixing, until air exits the channel segment between the vanes. Thus, the distance d between distal end 327 and the lower edge of lip 53 preferably kept to a minimum. According to a preferred embodiment of the present invention, distance d is no more than about 20% of the length of the vanes, so that separation of the flows is maintained over about 80% or more of the flow path of air past the separation point at the inlet or proximal ends of the vanes. For a smaller nominal diameter of air ring, the 20% figure should be reduced.

Upon assembly of outer ring 321 on inner ring 331, and mating of the resulting inner or lower plenum assembly 311 with outer or upper plenum assembly 211, vanes 325 register and mate with vanes 335 and vanes 235 to form a channel 53 comprising 72 continuous segments that extend to upper lip 51.

Figure 5:
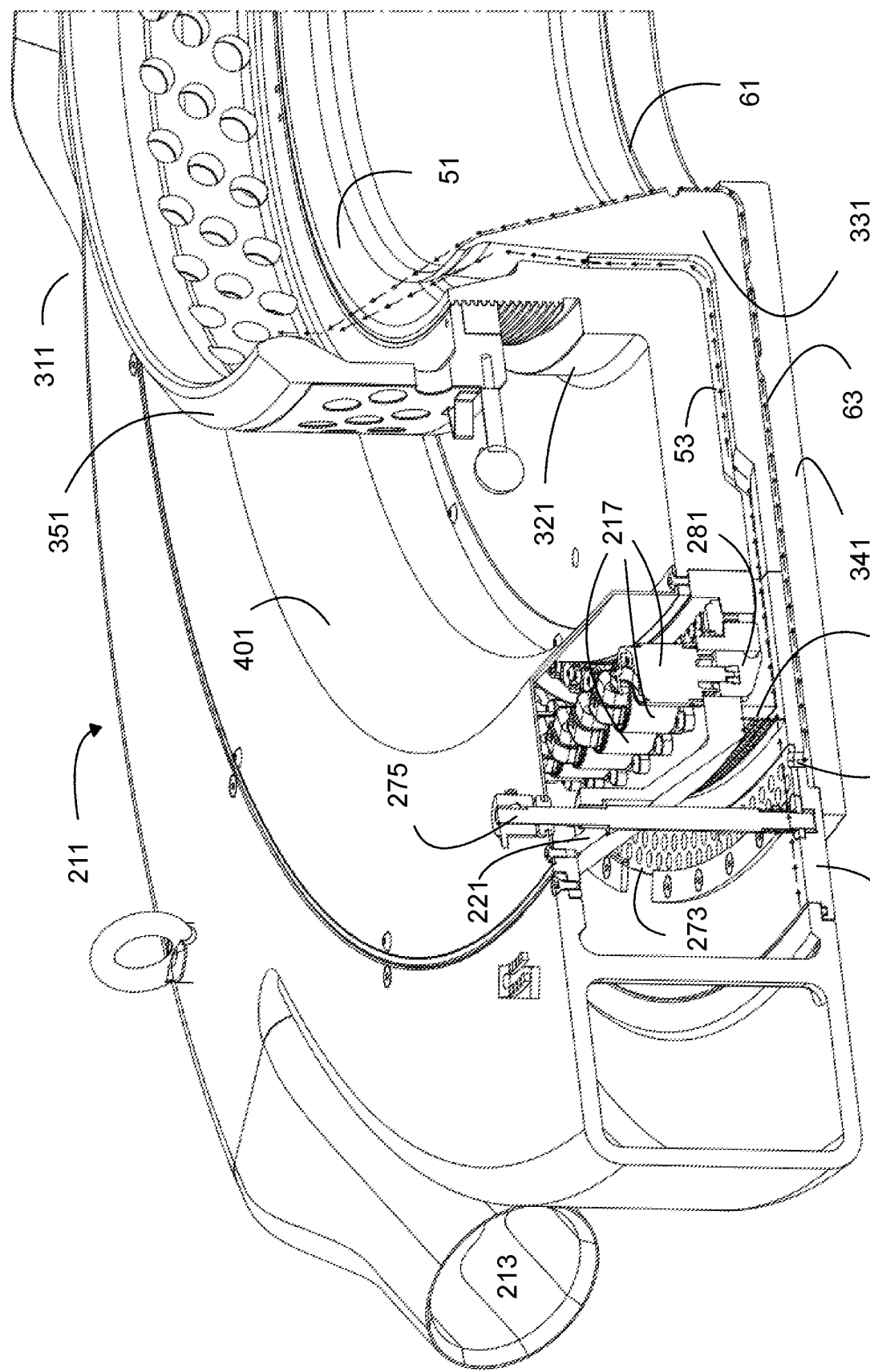
FIG. 5 is a fragmentary, section perspective view of the air ring with the upper and outer and inner and lower portions assembled together.

FIG. 5 depicts outer or upper plenum assembly 211 and inner or lower plenum assembly 311 assembled together into a complete air ring 11. The various components of each assembly may be fastened together screws, bolts, or other appropriate fasteners. A cover 401 may be provided over motors 217. The path of air from air inlets 215, through the interior of outer plenum body 213, to upper and lower lips 51, 61 through channels 53, 63 is depicted by arrows.

Air may flow from the interior of plenum body 213 through an annular baffle ring 291, past motors 217 (and associated plungers 281) and into channel 53. Baffle ring 291 provides a flow restriction or pressure drop at the entry to channel 53 to assist in balancing flow between upper and lower channels 53, 63. Baffle ring 291 includes a plurality of selectively dimensioned apertures and may be captured between circular grooves in plenum top 221 and plenum bottom 219. Baffle ring 291 may be easily removed and changed by separating outer 211 and inner 311 plenum assemblies.

Vanes 253 may divide the airflow into 72 separate channels and flow through each of the 72 channels remains separated until the air exits the air ring at upper lip 51. As shown in greater detail in FIG. 6, motors 217 may actuate plungers 281 that extend into each of the 72 channels to selectively obstruct each channel and control the volume of air flow through each channel. Thus, when air exits each channel segment at upper lip 51, different flow volumes may be achieved at 72 different points about the circumference of lip 51.

Air may flow from the interior of plenum body 213 through apertures 271 in bottom plenum 219 and into channel 63 to lower lip 61. Flow into channel 63 and out of lip 61 may be controlled by a control grid ring 273 that overlies and is generally coextensive with the band of apertures 271. Control grid ring 273 may have similarly sized apertures to apertures 271 and, by rotating ring 273 using control shaft 275, apertures 271 may be selectively obstructed (between fully "open" and fully "closed") to vary their area and control flow into channel 63 and to lower lip 61.

Figure 6:
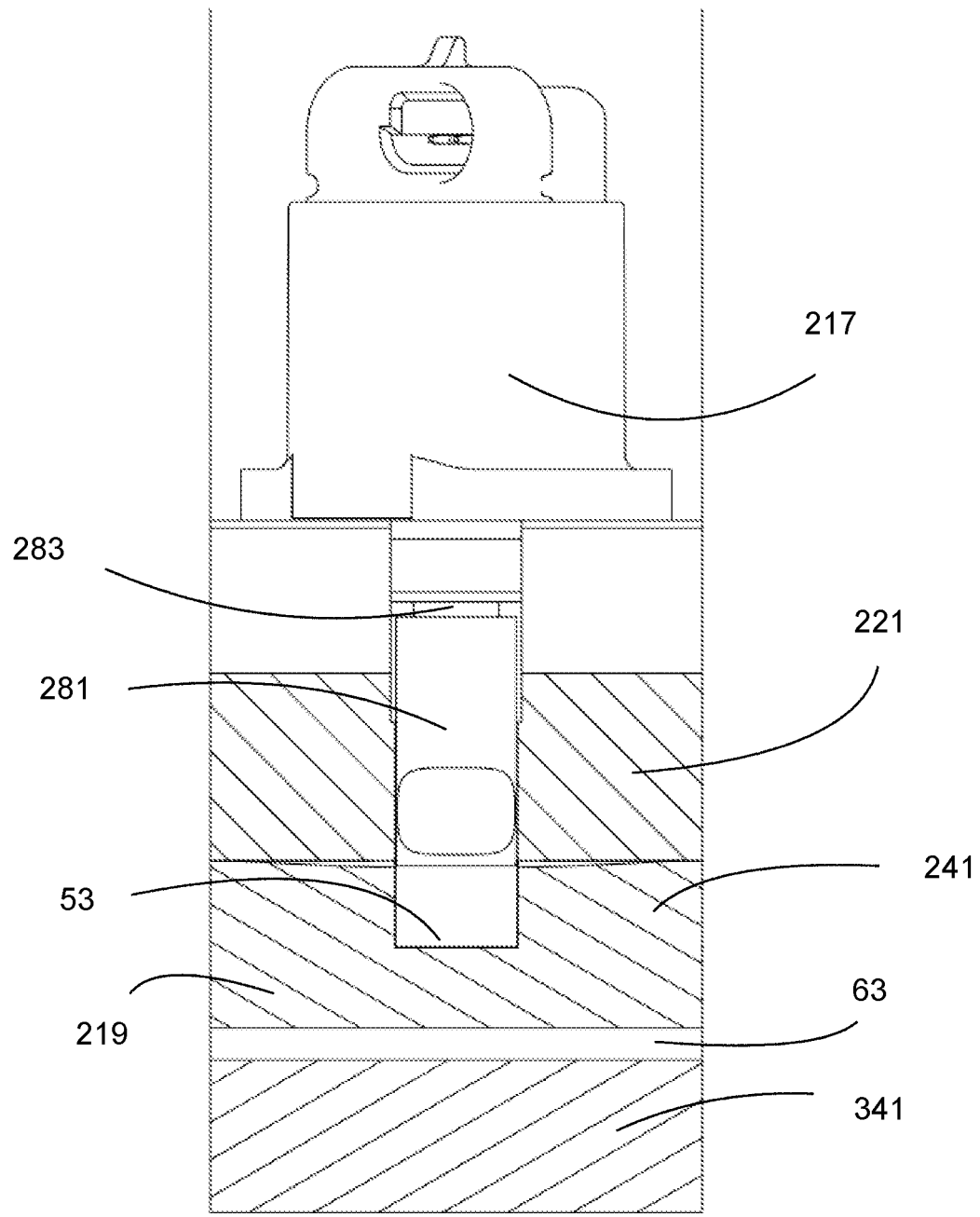
FIG. 6 is an elevation fragmentary section view of the motor, plunger, and channel of the air ring in accordance with the present invention.

FIG. 6 illustrates the operation of motor 217 to control flow through each associated segment of upper channel 53. Motor 217 may be mounted on upper plenum 221 and may be connected to a plunger 281 by a threaded shaft 283.

Plunger 281 fits closely between adjacent motor bosses 241 of an adjacent pair of vanes and may be dimensioned to completely obstruct airflow into channel segment 53 when plunger 281 fully obstructs channel 53. Motor 217 selectively rotates shaft 283, which raises and lowers plunger 281 between motor boss portion 241 of the vanes and into and out of channel 53. Thus, the area of channel 53 and the air flow there through may be varied and controlled by movement of powered plunger 283 responsive to motor 217 and shaft 283. The operation of motors 217 may be controlled by a computer or similar controller.

The air ring according to the described preferred embodiments of the invention has a number of advantages. Principally, by dividing flow to the upper lip into 72 segments and controlling flow through each channel independently, the air ring is able to regulate the volume of air to different areas of the tube or bubble to cool it at different rates about its circumference. By reducing flow, the tube or bubble wall becomes thinner (by cooling more slowly) and by increasing flow the tube or bubble wall becomes thicker (by cooling faster). Because the vanes extend and maintain separation between the channels almost the entire way to the exit of upper lip 51, mixing of the flows is minimized and greater control may be exercised.

The invention has been described with reference to preferred embodiments thereof. It is thus not limited, but is susceptible to variation and modification without departing from the scope and spirit of the invention.

We claim:

1. An air ring for cooling a blown film bubble, the air ring comprising:
   a circular plenum in fluid communication with a source of pressurized air;
   an upper annular lip in fluid communication with the plenum through an upper channel and arranged to supply air to the blown film bubble;
   a lower annular lip in fluid communication with the plenum through a lower channel and arranged to supply air to the blown film bubble at a location axially below the upper annular lip;
   a plurality of vanes disposed in the upper channel and extending radially inwardly from proximal the plenum to proximal the upper annular lip, the vanes defining a plurality of radial channels in the upper channel, each vane having a selected length and a distal end proximal the upper annular lip, a distance, measured linearly, from the distal end to the upper annular lip being no greater than about 20% of the selected length of the vane;
   a powered plunger extending between the vanes of each of the channels to vary air flow through the radial channels.

2. The air ring according to claim 1 further comprising:
   a perforated baffle ring between the plenum and upper channels to provide a flow restriction.

3. The air ring according to claim 1 further comprising:
   a control grid between the plenum and the lower channel, the control grid including apertures of selectively variable area to control air flow to the lower annular lip.

4. The air ring according to claim 2, wherein the air ring further comprises:
   an upper plenum ring assembly including the plenum;
   a lower plenum ring assembly including the upper and lower annular lips; and
   the baffle ring is captured in recesses between the upper and lower plenum ring assemblies and is removable from the air ring by separating the upper and lower plenum ring assemblies.

5. The air ring according to claim 1, further comprising a controlled motor powering each plunger, each motor and plunger selectively operable to change the cross-sectional area of the channel.

6. The air ring according to claim 3, wherein the control grid further comprises:
   a pair of concentric perforated rings rotatable relative to one another, wherein rotation of one of the pair of concentric perforated rings relative to the other of the pair of concentric rings varies airflow through apertures in the rings.

7. An air ring for cooling a blown film bubble, the air ring comprising:
   a circular plenum in fluid communication with a source of pressurized air;
   an upper annular lip in fluid communication with the plenum through an upper channel and arranged to supply air to the blown film bubble;
   a lower annular lip in fluid communication with the plenum through a lower channel and arranged to supply air to the blown film bubble at a location axially below the upper annular lip;
   a plurality of vanes disposed in the upper channel and extending radially inwardly from proximal the plenum toward the upper annular lip, the vanes defining a plurality of radial channels, each vane having a selected length and a distal end proximal the upper annular lip, a distance, measured linearly, from the distal end to the upper annular lip being no greater than about 20% of the selected length of the vane;
   a powered plunger extending between the vanes of each of the radial channels to vary air flow through the radial channels;
   a perforated baffle ring between the plenum and upper channel to provide a flow restriction; and
   a control grid between the plenum and the lower channel, and separate and spaced-apart from the perforated baffle ring, the control grid including apertures of selectively variable area to vary air flow to the lower annular lip.

8. The air ring according to claim 7, wherein the air ring further comprises:
   an upper plenum ring assembly including the plenum;
   a lower plenum ring assembly including the upper and lower annular lips; and
   the baffle ring is captured in recesses between the upper and lower plenum ring assemblies and is removable from the air ring by separating the upper and lower plenum ring assemblies.

9. The air ring according to claim 7, further comprising a controlled motor powering each plunger, each motor and plunger selectively operable to change the air flow through the radial channel.

10. The air ring according to claim 7, wherein the control grid is oriented vertically and the baffle ring is oriented horizontally.

11. The air ring according to claim 7, wherein the control grid further comprises:
   a pair of concentric perforated rings rotatable relative to one another, wherein rotation of one of the pair of concentric perforated rings relative to the other of the pair of concentric rings varies airflow through apertures in the rings.

12. An air ring for cooling a blown film bubble, the air ring comprising:
- an upper plenum ring assembly, including an upper plenum ring recess;
- a lower plenum ring assembly, including a lower plenum ring recess; and
- a plenum defined between the upper and lower plenum assemblies and in fluid communication with a source of pressurized air;
- an upper annular lip in fluid communication with the plenum through an upper channel and arranged to supply air to the blown film bubble;
- a lower annular lip in fluid communication with the plenum through a lower channel and arranged to supply air to the blown film bubble at a location axially below the upper annular lip;
- a plurality of vanes disposed in the upper channel and extending radially inwardly from proximal the plenum toward the upper annular lip, the vanes defining a plurality of radial channels, each vane having a selected length and a distal end proximal the upper annular lip;
- a powered plunger extending between the vanes of each of the radial channels to vary air flow through the radial channels;
- a perforated baffle ring captured in the recesses of the upper and lower plenum ring assemblies to provide a flow restriction, the perforated baffle ring removable from the air ring by separating the upper and lower plenum ring assemblies; and
- a control grid between the plenum and the lower channel, and separate and spaced-apart from the perforated baffle ring, the control grid including apertures of selectively variable area to vary air flow to the lower annular lip.

13. The air ring according to claim 12, further comprising a controlled motor powering each plunger, each motor and plunger selectively operable to change the air flow through the radial channel.

14. The air ring according to claim 12, wherein the control grid is oriented vertically and the baffle ring is oriented horizontally.

15. The air ring according to claim 12, wherein the control grid further comprises:
- a pair of concentric perforated rings rotatable relative to one another, wherein rotation of one of the pair of concentric perforated rings relative to the other of the pair of concentric rings varies airflow through apertures in the rings.

16. The air ring according to claim 12, wherein a distance, measured linearly, from the distal end to the upper annular lip is no greater than about 20% of the selected length of the vane.

* * * * *